(12) United States Patent
Watanabe et al.

(10) Patent No.: US 7,823,672 B2
(45) Date of Patent: Nov. 2, 2010

(54) STRUCTURE OF HYBRID VEHICLE

(75) Inventors: Ko Watanabe, Nishikamo-gun (JP);
Toshiyuki Hosokawa, Oyama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 307 days.

(21) Appl. No.: 11/884,929

(22) PCT Filed: Jun. 7, 2006

(86) PCT No.: PCT/JP2006/311893
§ 371 (c)(1),
(2), (4) Date: Aug. 23, 2007

(87) PCT Pub. No.: WO2007/007503
PCT Pub. Date: Jan. 18, 2007

(65) Prior Publication Data
US 2008/0164081 A1 Jul. 10, 2008

(30) Foreign Application Priority Data
Jul. 12, 2005 (JP) ............................ 2005-203208

(51) Int. Cl.
*B60R 16/02* (2006.01)
(52) U.S. Cl. .................. 180/68.5; 180/68.1; 180/65.21
(58) Field of Classification Search ... 180/65.21–65.29, 180/65.61, 68.1, 68.5
See application file for complete search history.

(56) References Cited

U.S. PATENT DOCUMENTS

| | | | |
|---|---|---|---|
| 2002/0179350 A1* | 12/2002 | Li | 180/65.3 |
| 2002/0185893 A1 | 12/2002 | Hashirayama et al. | |
| 2006/0046894 A1* | 3/2006 | Kyle | 477/3 |
| 2006/0060236 A1* | 3/2006 | Kim | 136/203 |
| 2006/0169507 A1* | 8/2006 | Inoue et al. | 180/68.4 |

FOREIGN PATENT DOCUMENTS

JP  A-2000-245015  9/2000

(Continued)

OTHER PUBLICATIONS

Oct. 26, 2009 Office Action issued in European Application No. 06 747 295.1—2421.

*Primary Examiner*—Paul N Dickson
*Assistant Examiner*—Erez Gurari
(74) *Attorney, Agent, or Firm*—Oliff & Berridge, PLC (57) ABSTRACT

A structure of a hybrid vehicle includes a battery pack arranged on a floor panel and an exhaust pipe extending from an engine, passing below the floor panel, to an exhaust port. The battery pack has a secondary battery constituted by a plurality of battery cells stacked in a vehicle traveling direction for supplying electric power to a motor, and an intake chamber provided adjacent to the secondary battery in a substantially horizontal direction perpendicular to the direction along which the plurality of battery cells are stacked for supplying cooling air between each of the plurality of battery cells. The exhaust pipe is provided so that it passes immediately below the battery pack and passes a position displaced from a position immediately below the intake chamber. With such a configuration, a structure of a hybrid vehicle that suppresses reduction in the efficiency of cooling a secondary battery without placing a great limit on routing of an exhaust pipe is provided.

6 Claims, 7 Drawing Sheets

FOREIGN PATENT DOCUMENTS

| | | |
|---|---|---|
| JP | A-2000-351328 | 12/2000 |
| JP | A-2001-018664 | 1/2001 |
| JP | A-2001-138753 | 5/2001 |
| JP | A-2003-300419 | 10/2003 |
| JP | A-2003-326980 | 11/2003 |
| JP | A-2004-345447 | 12/2004 |
| JP | A-2004-345449 | 12/2004 |
| WO | WO 2004/071798 A1 | 8/2004 |

* cited by examiner

STRUCTURE OF HYBRID VEHICLE

TECHNICAL FIELD

The present invention generally relates to a structure of a hybrid vehicle having an internal combustion engine and a motor as its motive power source, and more particularly, to a structure of a hybrid vehicle including a battery pack of a side-flow type wherein cooling air flows in the horizontal direction.

BACKGROUND ART

As to a conventional structure of a hybrid vehicle, for example Japanese Patent Laying-Open No. 2001-138753 (Patent Document 1) discloses a vehicle lower body structure of a hybrid vehicle having an object of lowering the floor while reducing the length in the longitudinal direction of the vehicle. In the hybrid vehicle disclosed in Patent Document 1, a battery case storing a battery is arranged below a seat in the vehicle room. An exhaust pipe attached to an exhaust manifold of an engine extends below a floor panel toward an exhaust port situated at the rear of the vehicle. The exhaust pipe extends in a position not overlapping with the battery when the vehicle is seen two-dimensionally.

Japanese Patent Laying-Open No. 2003-326980 (Patent Document 2) discloses a loading structure for an exhaust pipe, which has an object of suppressing a local temperature increase of a battery caused by heat of an exhaust pipe. Similarly to the hybrid vehicle disclosed in Patent Document 1, also in Patent Document 2, the battery is arranged so that it is not positioned immediately above the exhaust pipe.

Japanese Patent Laying-Open No. 2001-18664 (Patent Document 3) discloses an air-intaking and exhausting apparatus in an air cooling system having an object of efficiently cooling a power drive unit and a down converter without using an air conditioning apparatus in the vehicle. Japanese Patent Laying-Open No. 2000-351328 (Patent Document 4) discloses a battery mounting structure for an electric vehicle having an object of mounting a battery on one side below a vehicle floor without impairing support stability.

A battery pack mounted on a hybrid vehicle is classified by the direction of the flow of cooling air into a side-flow type wherein the cooling air is caused to flow in the horizontal direction to cool the secondary battery, and an up-flow type or a down-flow type wherein the cooling air is caused to flow in the vertical direction to cool the secondary battery. With the side-flow type, an intake chamber supplying cooling air toward the secondary battery and an exhaust chamber exhausting the cooling air from the secondary battery are arranged on opposite sides of the secondary battery. However, in this case, since there is no chamber below the secondary battery as in the up-flow or down-flow type, the battery pack is greatly affected by heat from under the floor panel when the battery pack is arranged on the floor panel of the vehicle. This may impair the efficiency of cooling the secondary battery.

On the other hand, in the hybrid vehicle disclosed in Patent Document 1, the exhaust pipe is arranged so that it does not overlap with the battery when seen two-dimensionally. However, the exhaust pipe must be detoured around the battery case, and therefore the pipe is greatly bent along its route. When the exhaust pipe is excessively bent in such a manner, exhaust efficiency may be reduced and the engine performance may be impaired.

DISCLOSURE OF THE INVENTION

An object of the present invention is to solve the aforementioned problems, and to provide a structure of a hybrid vehicle that suppresses reduction in the efficiency of cooling a secondary battery without placing a great limit on routing of an exhaust pipe.

A structure of a hybrid vehicle according to one aspect of the present invention is a structure of a hybrid vehicle having an internal combustion engine and a motor. The structure of a hybrid vehicle includes: a battery pack arranged on a vehicle floor; and an exhaust passage having an exhaust port and extending from the internal combustion engine, passing below the vehicle floor, to the exhaust port. The battery pack has a secondary battery constituted by a plurality of battery cells stacked in a vehicle traveling direction for supplying electric power to the motor, and an intake chamber provided adjacent to the secondary battery in a substantially horizontal direction perpendicular to the direction along which the plurality of battery cells are stacked for supplying cooling air between each of the plurality of battery cells. The exhaust passage is provided so that it passes immediately below the battery pack and passes a position displaced from a position immediately below the intake chamber.

With the structure of a hybrid vehicle thus configured, it is not necessary to detour around the battery pack when routing the exhaust passage from the internal combustion engine to the exhaust port. Accordingly, excessively bent route of the exhaust passage can be avoided, and the performance of the internal combustion engine can be prevented from being impaired. Here, the exhaust passage is provided so that it passes a position displaced from a position immediately below the intake chamber. Therefore, the effect of heat of the exhaust passage on the cooling air in the intake chamber is suppressed to be small, and thus an increase in the temperature of the cooling air before being provided to the plurality of battery cells can be suppressed. Thus, a significant reduction in the efficiency of cooling the secondary battery can be prevented.

Further, the plurality of battery cells include a first battery cell region positioned relatively near to the intake chamber, and a second battery cell region positioned relatively far from the intake chamber. Preferably, the exhaust passage is provided so that it passes immediately below the first battery cell region. With the structure of a hybrid vehicle thus configured, the battery cells of the second battery cell region are cooled by the cooling air after cooling the battery cells of the first battery cell region, and therefore a temperature distribution of the battery cells exists, in which the temperature is low in the first battery cell region and high in the second battery cell region. In the present invention, as the battery cells of the first battery cell region more greatly affected by heat of the exhaust passage, the temperature distribution of the battery cells between the first battery cell region and the second battery cell region can be made small.

A structure of a hybrid vehicle according to another aspect of the present invention is a structure of a hybrid vehicle having an internal combustion engine and a motor. The structure of a hybrid vehicle includes: a battery pack arranged on a vehicle floor; and an exhaust passage having an exhaust port and extending from the internal combustion engine, passing below the vehicle floor, to the exhaust port; and a catalyst portion provided on a route of the exhaust passage for purifying exhaust gas. The battery pack has a secondary battery constituted by a plurality of battery cells stacked in a vehicle width direction for supplying electric power to the motor, and an intake chamber provided adjacent to the secondary battery in a substantially horizontal direction perpendicular to the direction along which the plurality of battery cells are stacked for supplying cooling air between each of the plurality of battery cells. The exhaust passage is provided so that it passes immediately below the battery pack. The catalyst portion is arranged at a position displaced from a position immediately below the intake chamber.

With the structure of a hybrid vehicle thus configured, it is not necessary to detour around the battery pack when routing the exhaust passage from the internal combustion engine to the exhaust port. Accordingly, excessively bent route of the exhaust passage can be avoided, and the performance of the internal combustion engine can be prevented from being impaired. Here, the catalyst portion arranged at the exhaust passage is arranged at a position displaced from a position immediately below the intake chamber. Accordingly, the effect of heat generated at the catalyst portion due to catalytic reaction on the cooling air in the intake chamber can be suppressed to be small, and thus an increase in the temperature of the cooling air before being supplied between each of the plurality of battery cells can be suppressed. Thus, a significant reduction in the efficiency of cooling the secondary battery can be prevented.

A structure of a hybrid vehicle according to still another aspect of the present invention is a structure of a hybrid vehicle having an internal combustion engine and a motor. The structure of a hybrid vehicle includes: a battery pack that has a secondary battery supplying electric power to the motor and that is arranged on a vehicle floor; an exhaust passage having an exhaust port and extending from the internal combustion engine, passing below the vehicle floor, to the exhaust port; and a catalyst portion provided on a route of the exhaust passage for purifying exhaust gas. The exhaust passage is provided so that it passes immediately below the battery pack. The catalyst portion is arranged at a position displaced from a position immediately below the battery pack.

With the structure of a hybrid vehicle thus configured, it is not necessary to detour around the battery pack when routing the exhaust passage from the internal combustion engine to the exhaust port. Accordingly, excessively bent route of the exhaust passage can be avoided, and the performance of the internal combustion engine can be prevented from being impaired. Here, the catalyst portion provided at the exhaust passage is arranged at a position displaced from a position immediately below the battery pack. Accordingly, an increase in the temperature of the cooling air flowing in the battery pack due to the heat generated at the catalyst portion by catalytic reaction can be suppressed. Thus, a significant reduction in the efficiency of cooling the secondary battery can be prevented.

Further, the secondary battery is constituted by a plurality of battery cells stacked in a vehicle traveling direction. The battery pack further has an intake chamber provided adjacent to the secondary battery in a substantially horizontal direction perpendicular to the direction along which the plurality of battery cells are stacked for supplying cooling air between each of the plurality of battery cells. The plurality of battery cells includes a first battery cell region positioned relatively near to the intake chamber, and a second battery cell region positioned relatively far from the intake chamber. Preferably, the exhaust passage is provided so that it passes immediately below the first battery cell region. With the structure of a hybrid vehicle thus configured, as the battery cells of the first battery cell region more greatly affected by heat of the exhaust passage, the temperature distribution of the battery cells between the first battery cell region and the second battery cell region can be made small.

A structure of a hybrid vehicle according to still another aspect of the present invention is a structure of a hybrid vehicle having an internal combustion engine and a motor. The structure of a hybrid vehicle includes: a battery pack arranged on a vehicle floor; and an exhaust passage having an exhaust port and extending from the internal combustion engine, passing below the vehicle floor, to the exhaust port. The battery pack has a secondary battery constituted by a plurality of battery cells stacked in a vehicle width direction for supplying electric power to the motor, an intake chamber provided adjacent to the secondary battery in a substantially horizontal direction perpendicular to the direction along which the plurality of battery cells are stacked for supplying cooling air between each of the plurality of battery cells, and an exhaust chamber arranged opposite to the intake chamber relative to the secondary battery for exhausting the cooling air from between each of the plurality of battery cells. The intake chamber and the exhaust chamber each include one end and the other end separated in a direction along which the plurality of battery cells are stacked, and extend from one end to the other end. When the cooling air is introduced from one end of the intake chamber and exhausted from the other end of the exhaust chamber, the exhaust passage is provided to pass immediately below the battery pack at a position nearer to the other end than to one end. When the cooling air is introduced from one end of the intake chamber and exhausted from one end of the exhaust chamber, the exhaust passage is provided to pass immediately below the battery pack at a position nearer to one end than to the other end.

With the structure of a hybrid vehicle thus configured, it is not necessary to detour around the battery pack when routing the exhaust passage from the internal combustion engine to the exhaust port. Accordingly, excessively bent route of the exhaust passage can be avoided, and the performance of the internal combustion engine can be prevented from being impaired. Here, when the cooling air is introduced from one end of the intake chamber and exhausted from the other end of the exhaust chamber, the flow rate of the cooling air flowing between each of the battery cells is greater in a position nearer to the other end than to one end, and a temperature distribution of the battery cells exists, in which the temperature is low in the position nearer to the other end and high in the position nearer to one end. When the cooling air is introduced from one end of the intake chamber and exhausted from one end of the exhaust chamber, the flow rate of the cooling air flowing between each of the battery cells is greater in a position nearer to one end than to the other end, and a temperature distribution of the battery cells exists, in which the temperature is low in the position nearer to one end and high in the position nearer to the other end. In the present invention, the exhaust passage extends in a position near to the other end and to one end in respective cases, and therefore the temperature distribution of the battery cells can be made small by the heat of the exhaust passage.

As described above, according to the present invention, a structure of a hybrid vehicle that suppresses reduction in the efficiency of cooling a secondary battery without placing a great limit on routing of an exhaust pipe can be provided.

BEST MODES FOR CARRYING OUT THE INVENTION

Embodiments of the present invention will be described referring to the drawings. In the drawings referred to, the same or corresponding members are denoted by the same reference character.

First Embodiment

Figure 1:
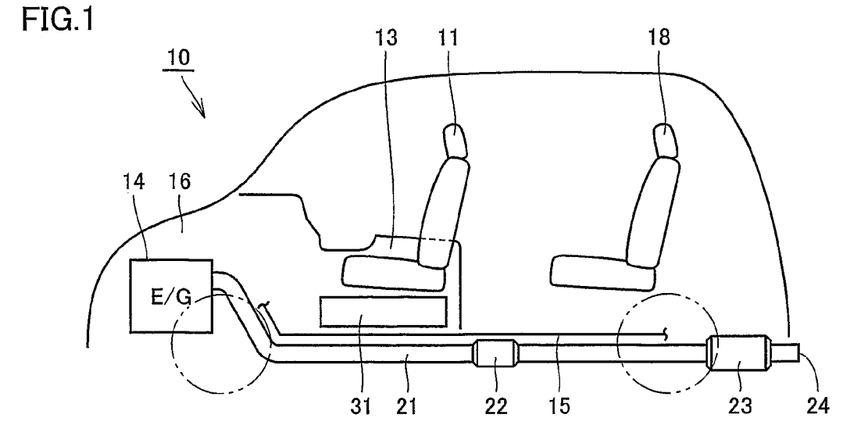
FIG. 1 is a side view of a hybrid vehicle in a first embodiment of the present invention.
Figure 2:
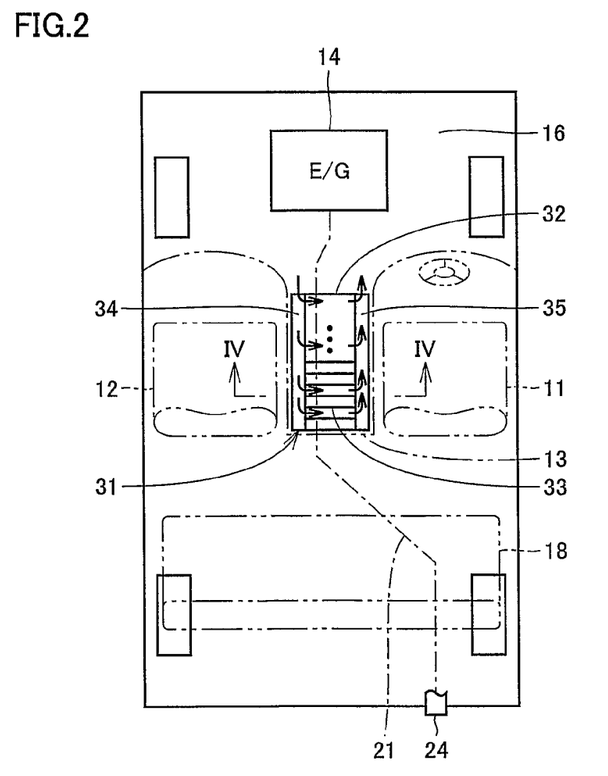
FIG. 2 is a plan view of the hybrid vehicle shown in FIG. 1.

FIG. 1 is a side view of a hybrid vehicle in a first embodiment of the present invention. FIG. 2 is a plan view of the hybrid vehicle shown in FIG. 1. Referring to FIGS. 1 and 2, a hybrid vehicle 10 has as its source of motive power a gasoline engine 14 (hereinafter simply referred to as engine 14) and a motor electrically supplied from a secondary battery (battery) 32 that can be charged or discharged.

Engine 14 is stored in an engine room 16 formed on a front side of the vehicle. To an exhaust manifold of engine 14, an exhaust pipe 21 is connected. Exhaust pipe 21 extends from inside of engine room 16, passing below a floor panel 15, toward the rear of the vehicle. Floor panel 15 constitutes the floor board of the vehicle, and extends facing to the ground. Exhaust pipe 21 has, at its tip extending toward the rear of the vehicle, an exhaust port 24 opening toward the outside of the vehicle. The exhaust gas from engine 14 is guided through exhaust pipe 21 to the rear of the vehicle, and exhausted outside the vehicle from exhaust port 24.

On the route of exhaust pipe 21, in the order closer to engine 14, a three-way catalyst 22 purifying the exhaust gas, and a muffler 23 suppressing combustion noise in each cylinder of the engine are provided. Three-way catalyst 22 is a catalyst that simultaneously changes CO, HC (hydrocarbon) and NOx (nitrogen oxides) to $CO_2$, $H_2O$ and $N_2$, respectively, and configured by forming, on a monolith base, a coat layer containing an alumina support and noble metal such as platinum and rhodium, for example.

In the room of hybrid vehicle 10, a driver's seat 11 and a front passenger's seat 12 are provided aligned in the vehicle width direction. The vehicle width direction is perpendicular to the vehicle traveling direction. Between driver's seat 11 and front passenger's seat 12, a center console 13 made of resin is provided. Center console 13 is provided, for example, to sophisticate the interior, to provide a cup holder for placing a drink container, and to provide a depression for placing small articles.

Battery pack 31 storing secondary battery 32 is provided on floor panel 15 and for example inside center console 13. Battery pack 31 is arranged between engine 14 and exhaust port 24 in the vehicle traveling direction, and in the present embodiment, arranged overlapping with a line connecting engine 14 and exhaust port 24. When seen from above the vehicle, battery pack 31 is arranged to be positioned between engine 14 and exhaust port 24. Battery pack 31 and exhaust pipe 21 are provided next to each other with floor panel 15 interposed between them.

Figure 3:
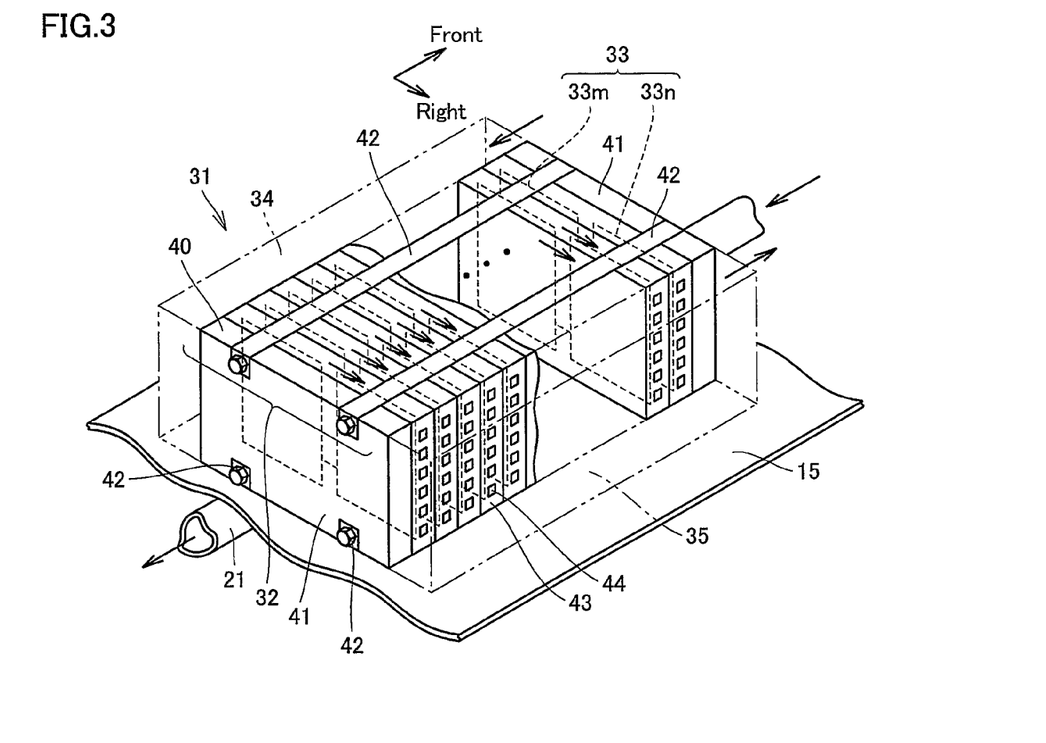
FIG. 3 is a perspective view showing a battery pack shown in FIG. 1.

FIG. 3 is a perspective view showing a battery pack shown in FIG. 1. In the drawing, a case body that is an outer package of the battery pack is drawn as transparent. Referring to FIGS. 2 and 3, secondary battery 32 stored in battery pack 31 is constituted by a plurality of battery cells 33. In the present embodiment, pairs of battery cells 33m and 33n aligned in parallel are stacked in the vehicle traveling direction to constitute secondary battery 32. A plurality of battery cells 33 are electrically connected in series with each other by a not-shown bus bar. Battery cell 33 is formed by a lithium ion battery. It is noted that battery cell 33 is not particularly limited so long as it is a secondary battery that can be charged or discharged, and it may be a nickel-hydride metal battery, for example.

The pairs of battery cells 33m and 33n are retained by resin frames 43 formed by a resin material such as polypropylene, for example. Resin frames 43 are aligned in a plurality of numbers in the vehicle traveling direction while retaining battery cells 33m and 33n. On opposite sides of resin frames 43 arranged in a plurality of numbers, end plates 40 and 41 are arranged. End plate 40 and end plate 41 are bound to each other by a binding band 42 with a plurality of resin frames 43 being interposed between them.

At battery pack 31, an intake chamber 34 and an exhaust chamber 35 are formed, positioned on the opposite sides of secondary battery 32. Intake chamber 34 and exhaust chamber 35 are adjacent to secondary battery 32 in the horizontal direction perpendicular to the vehicle traveling direction along which battery cells 33 are stacked, that is, in the vehicle width direction. A plurality of battery cells 33m stacked in the vehicle traveling direction are provided adjacent to intake chamber 34, and a plurality of battery cells 33n stacked in the vehicle traveling direction are provided adjacent to exhaust chamber 35.

At resin frame 43, a cooling air passage 44 passing between battery cells 33 that are adjacent to each other in the vehicle traveling direction is formed. Cooling air passage 44 communicates with intake chamber 34 and exhaust chamber 35 at the opposite sides of secondary battery 32. The cooling air introduced from the room into battery pack 31 flows from intake chamber 34 into cooling air passage 44. The cooling air first cools battery cells 33m and thereafter cools battery cells 33n while flowing through cooling air passage 44. The cooling air which is increased in the temperature by heat exchange with battery cells 33 is exhausted from cooling air passage 44 to exhaust chamber 35.

Figure 4:
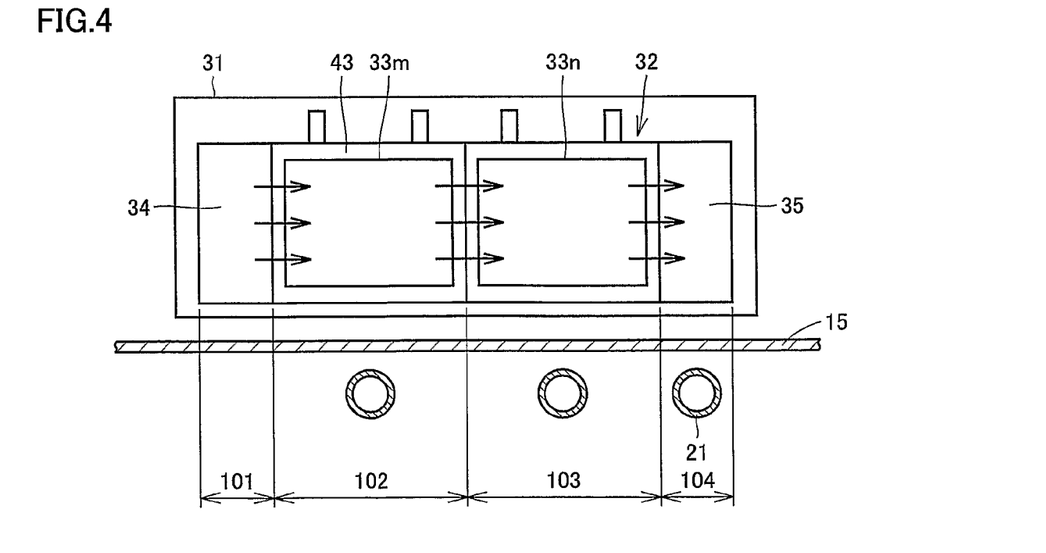
FIG. 4 is a cross-sectional view of a battery pack along line IV-IV in FIG. 2.

FIG. 4 is a cross-sectional view of the battery pack along line IV-IV in FIG. 2. Referring to FIGS. 3 and 4, exhaust pipe 21 extends in a position immediately below battery pack 31 and in a position displaced from a position immediately below intake chamber 34, that is, in a position overlapping with battery pack 31 excluding intake chamber 34 when hybrid vehicle 10 is seen two-dimensionally. Exhaust pipe 21 extends so as to overlap with battery pack 31 and not with intake chamber when seen from above the vehicle. Exhaust pipe 21 extends in the vehicle traveling direction, being separated from intake chamber 34 and overlapping with battery pack 31 when seen from above the vehicle. Exhaust pipe 21 is provided such that the heat quantity transferred from exhaust pipe 21 is relatively small in intake chamber 34 and relatively great in battery pack 31 excluding intake chamber 34. Exhaust pipe 21 in the present embodiment extends to cross both of end plates 40 and 41 binding a plurality of battery cells 33 from the opposite sides, when seen from above the vehicle. Exhaust pipe 21 extends positioned in a region 102 spreading immediately below battery cell 33$m$, a region 103 spreading immediately below battery cell 33$n$, or a region 104 spreading immediately below exhaust chamber 35. The region through which exhaust pipe 21 extends may be a plurality of those regions.

Assuming a case where exhaust pipe 21 extends through region 101 spreading immediately below intake chamber 34, the temperature of cooling air in intake chamber 34 increases, being affected by the exhaust gas of high temperature passing thorough exhaust pipe 21. In this case, as the cooling air with the increased temperature is supplied to secondary battery 32, the heat exchange between the cooling air and battery cell 33 is not achieved efficiently. Accordingly, the efficiency of cooling secondary battery 32 may significantly be reduced. On the other hand, according to the present embodiment, as exhaust pipe 21 extends through region 102, 103 or 104 displaced from region 101, the efficiency of cooling secondary battery 32 is prevented from being reduced affected by heat of exhaust pipe 21.

The reduction of efficiency of cooling secondary battery 32 is most effectively prevented when exhaust pipe 21 extends through region 104 spreading immediately below exhaust chamber 35. Further, when exhaust pipe 21 extends along the vehicle traveling direction that is the stacking direction of battery cells 33 in region 102 or 103 spreading immediately below battery cells 33, a difference in the temperature between each of battery cells 33 aligning in the vehicle traveling direction due to the effect of heat of exhaust pipe 21 can be avoided.

When exhaust pipe 21 extends through region 102 spreading immediately below battery cells 33$m$, the temperature of battery cells 33$m$ increases being affected by the heat of exhaust pipe 21. However, the temperature of battery cell 33$m$ positioned upstream of the cooling air flow tends to be lower than that of battery cells 33$n$ positioned downstream of the cooling air flow, and therefore the temperature difference between battery cells 33$m$ and battery cells 33$n$ can be made small.

Figure 5:
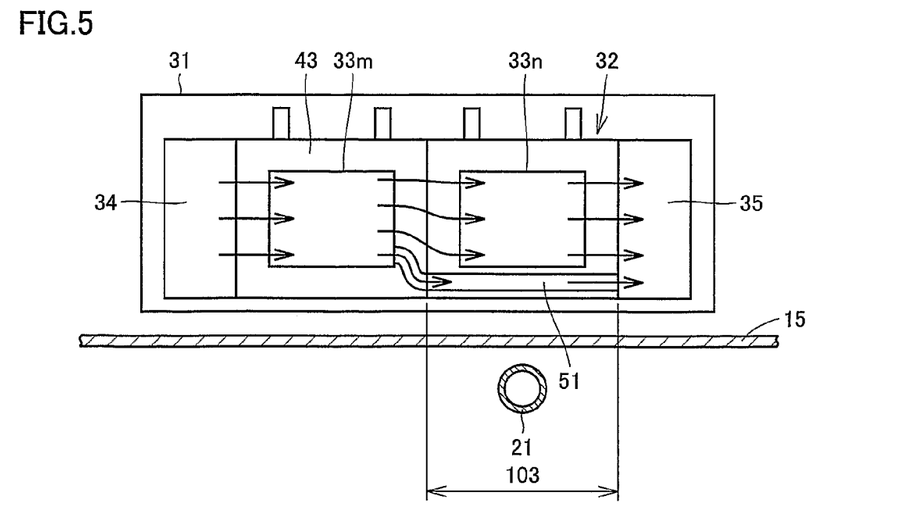
FIG. 5 is a cross-sectional view of a modification of a battery pack wherein an exhaust pipe extends immediately below a battery cell arranged downstream of a cooling air flow.

FIG. 5 is a cross-sectional view of a modification of the battery pack wherein the exhaust pipe extends immediately below the battery cell arranged downstream of the cooling air flow. Referring to FIG. 5, when exhaust pipe 21 extends in region 103 spreading immediately below battery cells 33$n$, a bypass flow channel 51 that directly connects the cooling air passage extending between each of a plurality of battery cells 33$m$ and exhaust chamber 35 may be formed in resin frame 43. Bypass flow channel 51 extends between battery cell 33$n$ and exhaust pipe 21. Bypass flow channel 51 guides the cooling air having passed between each of a plurality of battery cells 33$m$ to exhaust chamber 35, without passing between each of a plurality of battery cells 33$n$.

With such a structure, since the heat of exhaust pipe 21 is taken away by the cooling air flowing through bypass flow channel 51, the increase in the temperature of battery cells 33$n$ can be suppressed to be smaller. Thus, the difference in the temperature between battery cell 33$n$ and battery cell 33$m$ can be suppressed to be smaller.

Figure 6:
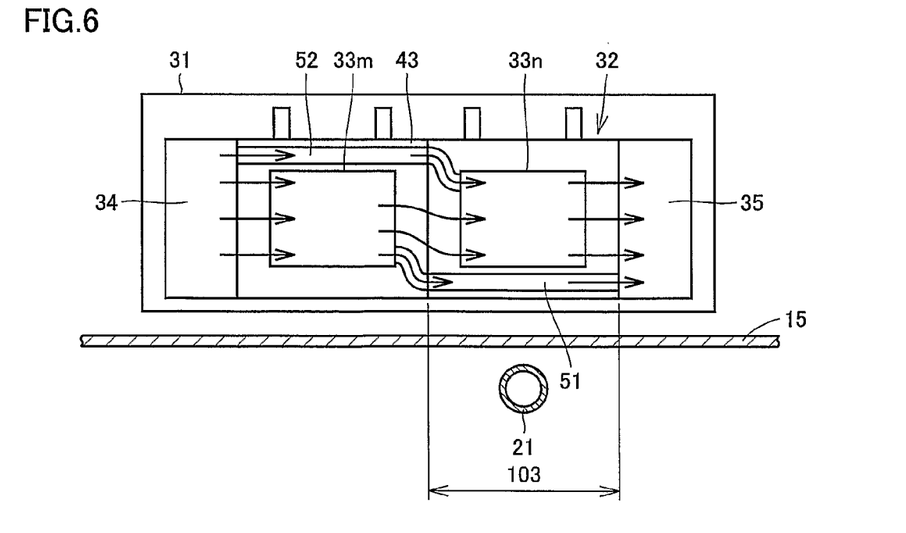
FIG. 6 is a cross-sectional view of another modification of a battery pack wherein an exhaust pipe extends immediately below a battery cell arranged downstream of a cooling air flow.

FIG. 6 is a cross-sectional view of another modification of the battery pack wherein the exhaust pipe extends immediately below the battery cell arranged downstream of the cooling air flow. Referring to FIG. 6, when exhaust pipe 21 extends through region 103 spreading immediately below battery cells 33$n$, in addition to bypass flow channel 51, a bypass flow channel 52 that directly connects intake chamber 34 and the cooling air passage extending between each of a plurality of battery cells 33$n$ may be formed in resin frame 43. Bypass flow channel 52 extends along the opposite side of floor panel 15 relative to battery cells 33$n$, and formed in a position hardly affected by the heat of exhaust pipe 21. Bypass flow channel 52 guides the cooling air passing in intake chamber 34 to between each of a plurality of battery cells 33$n$, without passing between each of a plurality of battery cells 33$m$.

With such a structure, by means of bypass flow channel 52, the cooling air not conducting heat exchange between battery cells 33$m$ is used for the heat exchange with battery cells 33$n$. With this method, as compared to the modification shown in FIG. 5, the flow rate of the cooling air flowing between each of battery cells 33$n$ can be made the same as or greater than the flow rate of the cooling air flowing between each of battery cells 33$m$, and thus the temperature of battery cell 33$n$ can be set even lower. Thus, the difference in the temperature between battery cells 33$m$ and battery cells 33$n$ can be made further smaller.

The structure of hybrid vehicle 10 as a hybrid vehicle in the first embodiment of the present invention includes battery pack 31 arranged on floor panel 15 as a vehicle floor, and exhaust pipe 21 as an exhaust passage having exhaust port 24 and extending from engine 14 as an internal combustion engine passing below floor panel 15 to exhaust port 24. Battery pack 31 has secondary battery 32 constituted by a plurality of battery cells 33 stacked in the vehicle traveling direction for supplying electric power to the motor, and intake chamber 34 provided adjacent to secondary battery 32 in a substantially horizontal direction perpendicular to the direction in which a plurality of battery cells 33 are stacked for supplying cooling air between each of a plurality of battery cells 33. Exhaust pipe 21 is provided so that it passes immediately below battery pack 31 and passes a position displaced from a position immediately below intake chamber 34.

With the structure of hybrid vehicle 10 in the first embodiment of the present invention thus configured, by arranging exhaust pipe 21 immediately below battery pack 31, it is not necessary to make exhaust pipe 21 detour around battery pack 31, and the degree of freedom in arranging exhaust pipe 21 is improved. Thus, exhaust pipe 21 is prevented from excessively bent or folded between engine 14 and exhaust port 24, improving the performance of engine 14. Further, in the present embodiment, since intake chamber 34 or exhaust chamber 35 is not arranged between secondary battery 32 and floor panel 15, battery pack 31 is susceptible to the effect of external environment below floor panel 15. However, as exhaust pipe 21 passes the position displaced from the position immediately below intake chamber 34, a significant reduction in the efficiency of cooling secondary battery 32 is prevented.

Although description has been given on the case where battery pack 31 is provided inside center console 13 in the present embodiment, the present invention is not limited thereto and battery pack 31 may be provided for example under driver's seat 11 or front passenger's seat 12, under rear sheet 18, or in a luggage room. Engine 14 is not limited to a gasoline engine, and it may be a diesel engine.

Second Embodiment

Figure 7:
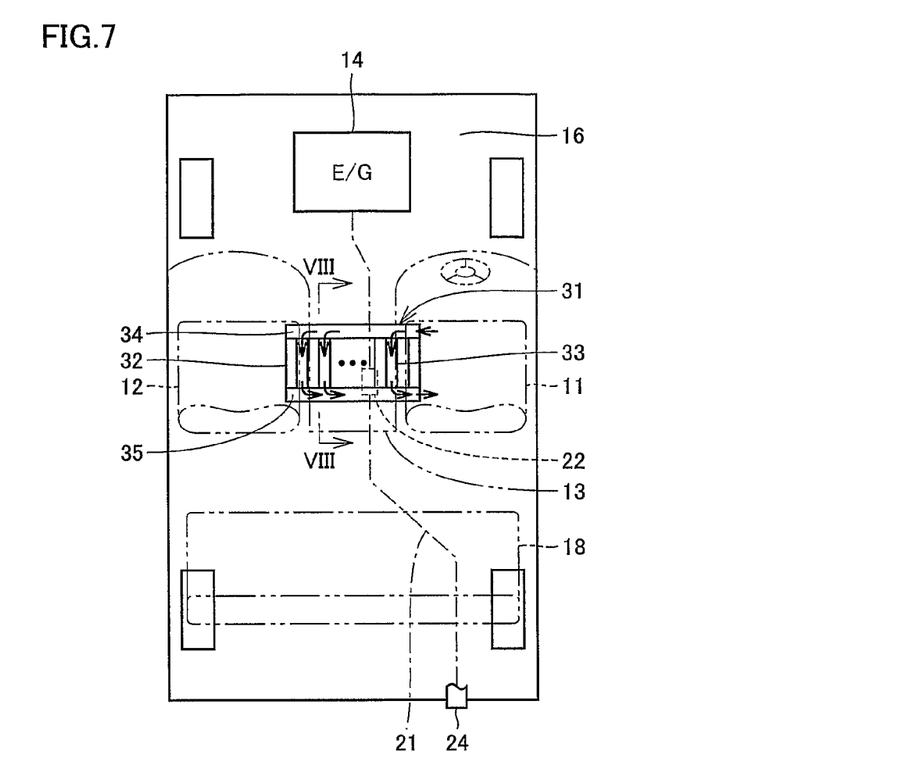
FIG. 7 is a plan view of a hybrid vehicle in a second embodiment of the present invention.
Figure 8:
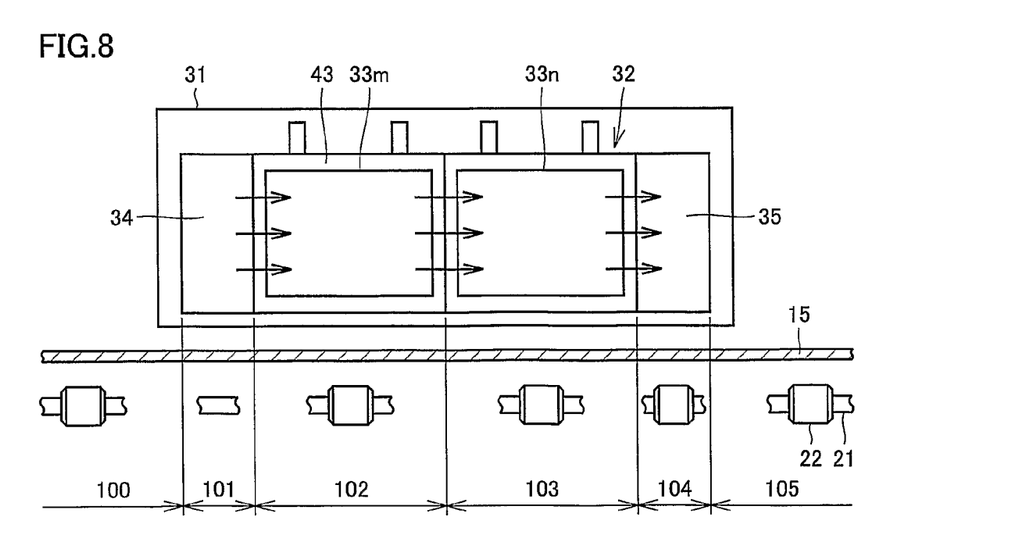
FIG. 8 is a cross-sectional view of a battery pack along line VIII-VIII in FIG. 7.

FIG. 7 is a plan view of a hybrid vehicle in a second embodiment of the present invention. FIG. 8 is a cross-sectional view of a battery pack along line VIII-VIII in FIG. 7. In the following, description of the structure being the same as in hybrid vehicle 10 in the first embodiment will not be repeated.

Referring to FIGS. 7 and 8, in the present embodiment, pairs of battery cells 33m and 33n aligned in parallel are stacked in the vehicle width direction to constitute secondary battery 32. Intake chamber 34 and exhaust chamber 35 are adjacent to secondary battery 32 in a horizontal direction perpendicular to the vehicle width direction along which battery cells 33 are stacked, that is, in the vehicle traveling direction. Exhaust pipe 21 extends immediately below battery pack 31, and extends through region 101 spreading immediately below intake chamber 34, regions 102 and 103 spreading immediately below battery cells 33m and 33n, respectively, and region 104 spreading immediately below exhaust chamber 35 in this order.

In the present embodiment, a three-way catalyst 22 is provided at a position displaced from a position immediately below intake chamber 34, that is, at a position not overlapping with intake chamber 34 when hybrid vehicle 10 is seen two-dimensionally. Three-way catalyst 22 is provided at region 102, 103, or 104 or at regions 100 and 105 being displaced from a position immediately below battery pack 31. The region where three-way catalyst 22 is arranged may be a plurality of these regions.

In place of three-way catalyst 22, an apparatus purifying exhaust gas by catalytic reaction such as oxidation catalyst, lean NOx catalyst, DPF (diesel particulate filter) with oxidation catalyst, or HC adsorption purify catalyst may be provided. Further, three-way catalyst 22 may be a catalyst provided immediately downstream of the exhaust manifold so that it attains the active temperature in the early stage when the engine is started.

As catalytic reaction occurs when exhaust gas passes through three-way catalyst 22, the temperature of three-way catalyst 22 increases. In the present embodiment, since three-way catalyst 22 is arranged in region 100, 102, 104, 104, or 105 that is displaced from region 101 spreading immediately below intake chamber 34, a significant reduction in the efficiency of cooling secondary battery 32 affected by heat generated in three-way catalyst 22 is suppressed.

The structure of hybrid vehicle in the second embodiment of the present invention includes battery pack 31 arranged on floor panel 15, exhaust pipe 21 having exhaust port 24 and extending from engine 14 and passing below floor panel 15 to exhaust port 24, and three-way catalyst 22 provided on the route of exhaust pipe 21 as a catalyst portion purifying exhaust gas. Battery pack 31 has secondary battery 32 constituted by a plurality of battery cells 33 stacked in the vehicle width direction for supplying electric power to the motor, and intake chamber 34 provided adjacent to secondary battery 32 in a substantially horizontal direction perpendicular to the direction along which a plurality of battery cells 33 are stacked for supplying cooling air between each of a plurality of battery cells 33. Exhaust pipe 21 is provided so that it passes immediately below battery pack 31. Three-way catalyst 22 is arranged at a position displaced from a position immediately below intake chamber 34.

With the structure of the hybrid vehicle in the second embodiment of the present invention thus configured, the effect similar to that described in the first embodiment can be attained.

Third Embodiment

Figure 9:
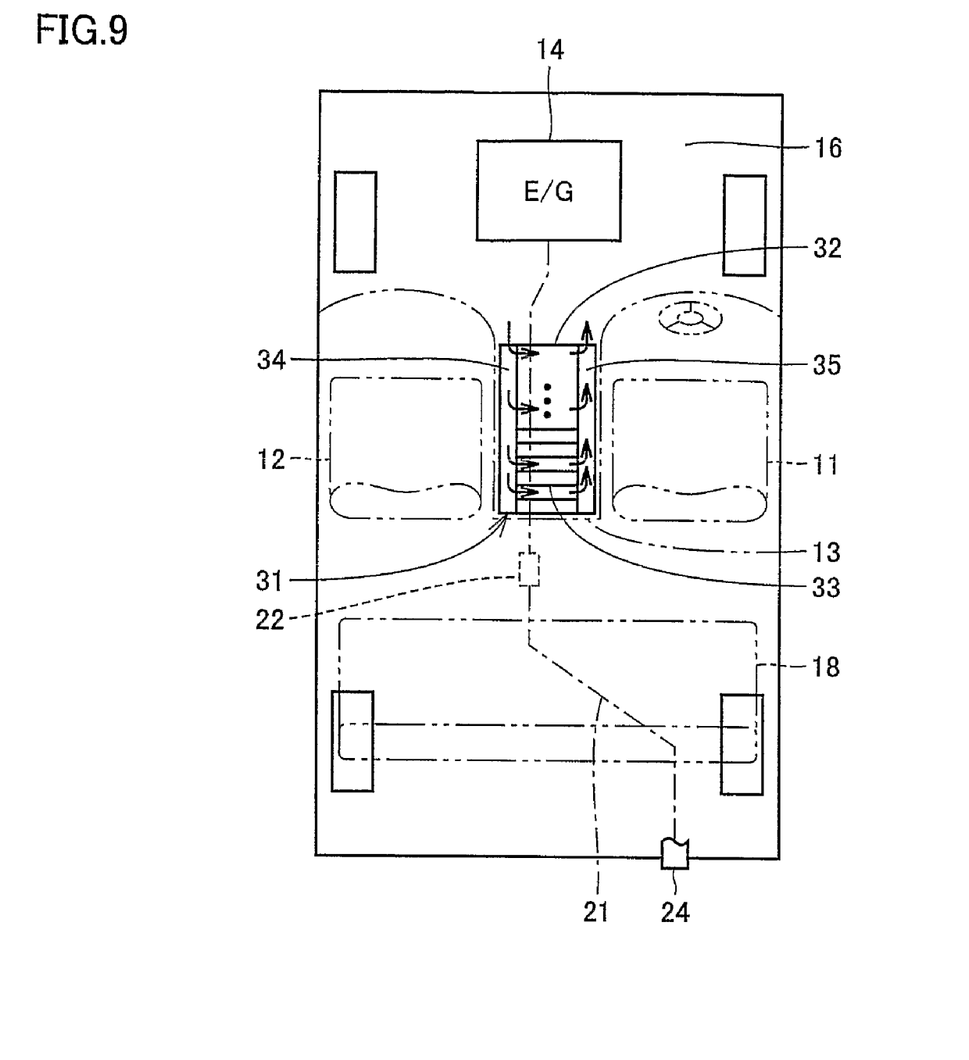
FIG. 9 is a plan view of a hybrid vehicle in a third embodiment of the present invention.

FIG. 9 is a plan view of a hybrid vehicle in a third embodiment of the present invention. In the following, description of the structure being the same as in the hybrid vehicle in the first and second embodiments will not be repeated.

Referring to FIG. 9, in the present embodiment, battery cells 33 are stacked in the vehicle traveling direction to constitute secondary battery 32. Intake chamber 34 and exhaust chamber 35 are adjacent to secondary battery 32 in a horizontal direction perpendicular to the vehicle traveling direction along which battery cells 33 are stacked, that is, in the vehicle width direction. Exhaust pipe 21 extends immediately below battery pack 31, and three-way catalyst 22 is arranged at a position displaced from a position immediately below battery pack 31. That is, exhaust pipe 21 extends at a position overlapping with battery pack 31 when hybrid vehicle 10 is seen two-dimensionally, and three-way catalyst 22 is arranged at a position not overlapping with battery pack 31. With such a configuration, a significant reduction in the efficiency of cooling secondary battery 32 affected by heat generated in three-way catalyst 22 is suppressed.

It is noted that, as in the first embodiment when exhaust pipe 21 extends through region 102 spreading immediately below battery cell 33m in FIG. 4, the difference in the temperature between battery cell 33m and battery cell 33n can be made small. When exhaust pipe 21 extends through region 103 spreading immediately below battery cell 33n, the bypass flow channel shown in FIGS. 5 and 6 may be applied to the hybrid vehicle shown in FIG. 9.

Figure 10:
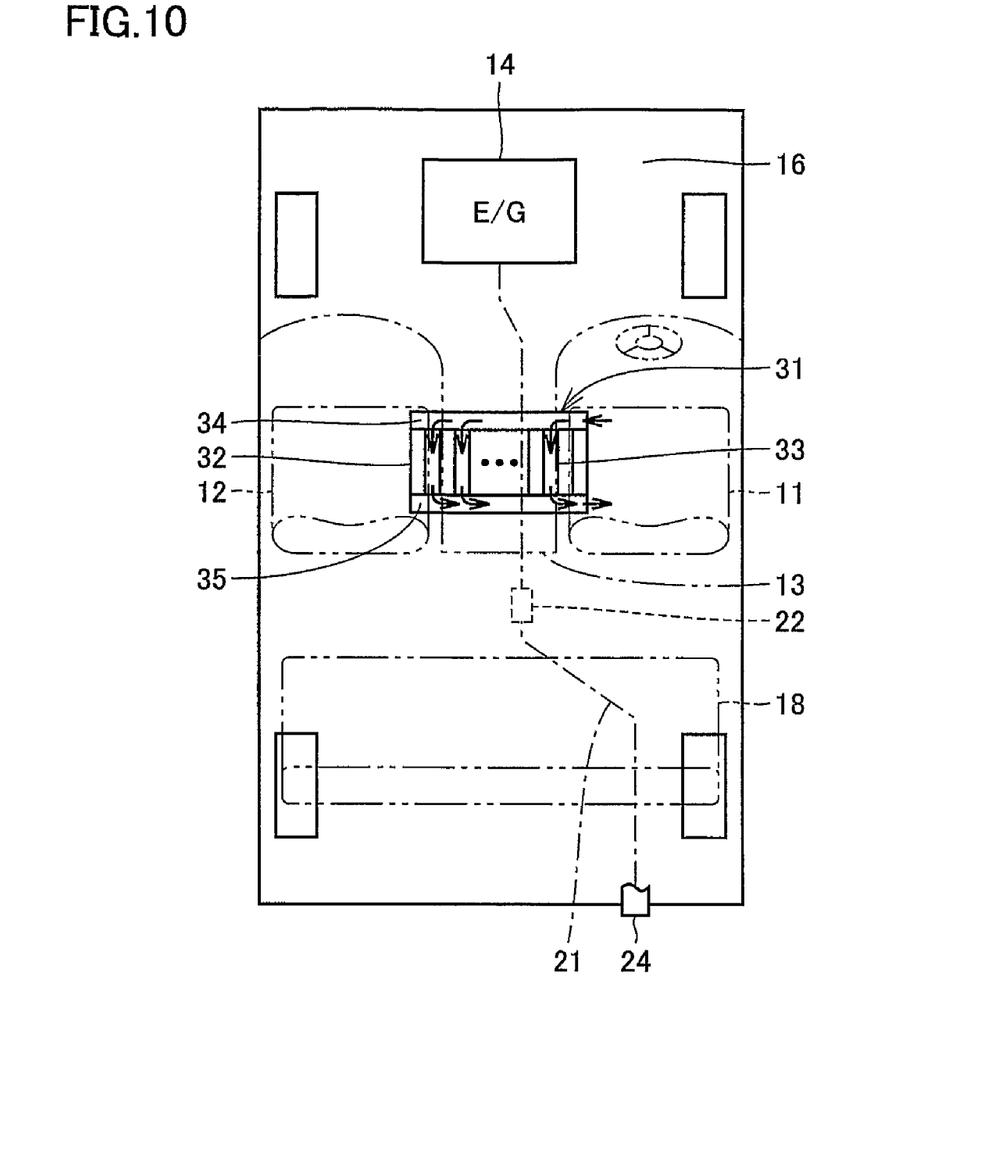
FIG. 10 is a plan view of a modification of the hybrid vehicle shown in FIG. 9.

FIG. 10 is a plan view of a modification of the hybrid vehicle shown in FIG. 9. Referring to FIG. 10, in the present modification wherein battery cells 33 are stacked in the vehicle width direction also, exhaust pipe 21 is provided to extend immediately below battery pack 31, and three-way catalyst 22 is arranged at a position being displaced from a position immediately below battery pack 31.

The hybrid vehicle in the third embodiment of the present invention includes battery pack 31 having secondary battery 32 supplying electric power to a motor and arranged on floor panel 15, exhaust pipe 21 having exhaust port 24 and extending from engine 14 and passing below floor panel 15 to exhaust port 24, and three-way catalyst 22 provided on the route of exhaust pipe 21 for purifying exhaust gas. The exhaust pipe 21 is provided to pass immediately below battery pack 31. Three-way catalyst 22 is arranged at a position displaced from a position immediately below battery pack 31.

With the structure of the hybrid vehicle in the third embodiment of the present invention thus configured, the effect similar to that described in the first embodiment can be attained.

Fourth Embodiment

Figure 11:
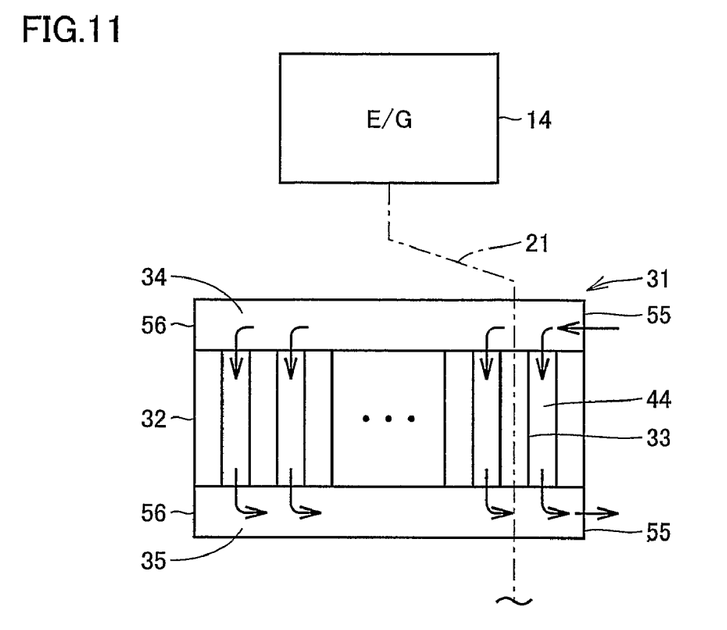
FIG. 11 is a plan view partially showing a hybrid vehicle in a fourth embodiment of the present invention.

FIG. 11 is a plan view partially showing a hybrid vehicle in a fourth embodiment of the present invention. In the following, description of the structure being the same as in the hybrid vehicle in the first to third embodiments will not be repeated.

Referring to FIG. 11, in the present embodiment, battery cells 33 are stacked in the vehicle width direction to constitute secondary battery 32. Intake chamber 34 and exhaust chamber 35 are adjacent to secondary battery 32 in a horizontal direction perpendicular to the vehicle width direction along which battery cells 33 are stacked, that is, in the vehicle traveling direction. Intake chamber 34 and exhaust chamber 35 each have one end 55 and the other end 56 separated in the vehicle width direction, and they extend in parallel to each other from one end 55 to the other end 56. The cooling air is introduced from one end 55 of intake chamber 34, and makes a turn in battery pack 31 and exhausted from one end 55 of exhaust chamber 35. Exhaust pipe 21 extends immediately below battery pack 31 nearer to one end 55 than to the other end 56.

In the present embodiment, the position at which cooling air is introduced into intake chamber 34 and the position at which the cooling air is exhausted from exhaust chamber 35 are provided on the same side of the extending direction of intake chamber 34 and exhaust chamber 35. Therefore, when the cooling air flows into intake chamber 34, rather than going to the other end 56 of intake chamber 34, it tends to pass between each of battery cells 33 to go to exhaust chamber 55. Accordingly, in the present embodiment, the flow rate of the cooling air flowing between each of battery cells 33 is greater in a position nearer to one end 55 than to the other end 56. On the other hand, as exhaust pipe 21 extends at a position nearer to one end 55 than to the other end 56, the difference in the temperature between each of battery cells 33 aligning in the vehicle width direction can be made small.

Figure 12:
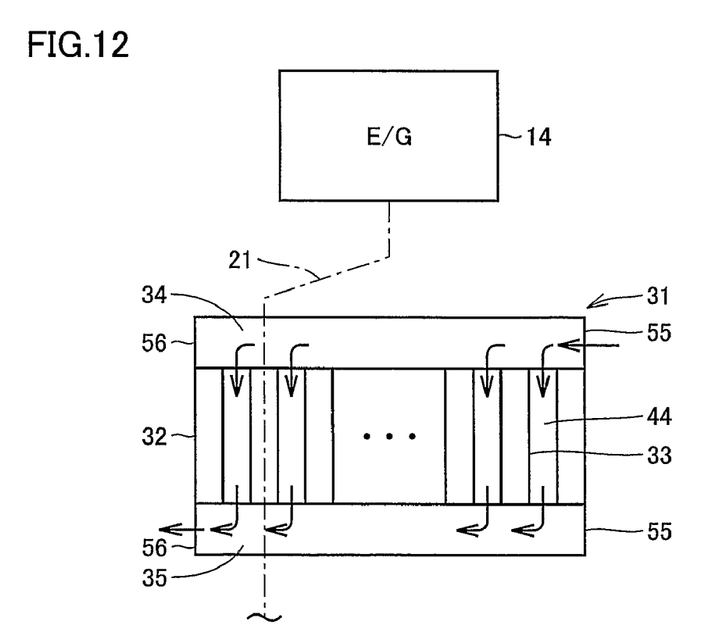
FIG. 12 is a plan view showing a modification of the battery pack shown in FIG. 11.

FIG. 12 is a plan view showing a modification of the battery pack shown in FIG. 11. Referring to FIG. 12, in the present modification, cooling air is introduced from one end 55 of intake chamber 34 and exhausted from the other end 56 of exhaust chamber 35. Exhaust pipe 21 extends immediately below battery pack 31 nearer to the other end 56 than to one end 55.

In this case, the position at which cooling air is introduced into intake chamber 34 and the position at which the cooling air is exhausted from exhaust chamber 35 are provided on opposite sides of the extending direction of intake chamber 34 and exhaust chamber 35. Therefore, when the cooling air flows into one end 55 of intake chamber 34, rather than passing between each of battery cells 33 and going to exhaust chamber 55, it tends to rush toward the other end 56 of intake chamber 34. Accordingly, the flow rate of the cooling air flowing between each of battery cells 33 is greater in a position nearer to the other end 56 than to one end 55. On the other hand, as exhaust pipe 21 extends at a position nearer to the other end 56 than to one end 55, the difference in the temperature between each of battery cells 33 aligning in the vehicle width direction can be made small.

The structure of the hybrid vehicle in the fourth embodiment of the present invention includes battery pack 31 arranged on floor panel 15 and exhaust pipe 21 having exhaust port 24 and extending from engine 14 and passing below floor panel 15 to exhaust port 24. Battery pack 31 has secondary battery 32 constituted by a plurality of battery cells stacked in the vehicle width direction for supplying electric power to the motor, intake chamber 34 provided adjacent to secondary battery 32 in a substantially horizontal direction perpendicular to the direction along which the plurality of battery cells 33 are stacked for supplying cooling air between each of the plurality of battery cells 33, and exhaust chamber 35 arranged on the opposite side of intake chamber 34 relative to secondary battery 32 for exhausting the cooling air from between each of the plurality of battery cells 33. Intake chamber 34 and exhaust chamber 35 include one end 55 and the other end 56 separated in the direction along which the plurality of battery cells 33 are stacked, and extend from one end 55 to the other end 56.

When the cooling air is introduced from one end 55 of intake chamber 34 and exhausted from the other end 56 of exhaust chamber 35, exhaust pipe 21 is provided to pass immediately below battery pack 31 at a position nearer to the other end 56 than to one end 55. When the cooling air is introduced from one end 55 of intake chamber 34 and exhausted from one end 55 of exhaust chamber 35, exhaust pipe 21 is provided to pass immediately below battery pack 31 at a position nearer to one end 55 than to the other end 56.

With the structure of the hybrid vehicle in the fourth embodiment of the present invention thus configured, the effect similar to that described in the first embodiment can be attained. Additionally, since variations in the temperature between each of battery cells 33 is suppressed to be small, improvements in the battery performance and the battery lifetime can be achieved.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

INDUSTRIAL APPLICABILITY

The present invention is applicable chiefly to a hybrid vehicle having an internal combustion engine and a motor as its motive power source.

The invention claimed is:

1. A structure of a hybrid vehicle having an internal combustion engine and a motor, comprising:
   a battery pack that has a secondary battery constituted by two or more sets of battery cells stacked in a vehicle traveling direction for supplying electric power to said motor, and an intake chamber provided adjacent to said secondary battery in a direction perpendicular to the direction along which said two or more sets of battery cells are stacked for supplying cooling air between each of said two or more sets of battery cells, and that is arranged on a vehicle floor; and
   an exhaust passage having an exhaust port and extending from said internal combustion engine, passing below said vehicle floor, to said exhaust port, wherein
   said exhaust passage is provided so that it passes immediately below said battery pack and passes a position displaced from a position immediately below said intake chamber,
   each set of battery cells includes a single layer of battery cells extending in a same direction and being in a same plane,
   the two or more sets of battery cells is stacked in an orthogonal direction that is orthogonal to the same plane, and
   the intake chamber extends parallel to the orthogonal direction.

2. The structure of a hybrid vehicle according to claim 1, wherein
   said two or more sets of battery cells include a first battery cell region positioned relatively near to said intake chamber, and a second battery cell region positioned relatively far from said intake chamber, and
   said exhaust passage is provided so that it passes immediately below said first battery cell region.

3. A structure of a hybrid vehicle having an internal combustion engine and a motor, comprising:
   a battery pack that has a secondary battery constituted by two or more sets of battery cells stacked in a vehicle width direction for supplying electric power to said motor, an intake chamber provided adjacent to said secondary battery in a direction perpendicular to the direction along which said two or more sets of battery cells are stacked for supplying cooling air between each of said two or more sets of battery cells, and an exhaust chamber arranged opposite to said intake chamber relative to said secondary battery for exhausting the cooling air from between each of said two or more sets of battery cells, and that is arranged on a vehicle floor;

an exhaust passage having an exhaust port and extending from said internal combustion engine, passing below said vehicle floor, to said exhaust port; and a catalyst portion provided on a route of said exhaust passage for purifying exhaust gas, wherein said exhaust passage is provided so that it passes immediately below said battery pack, and said catalyst portion is arranged at a position displaced from a position immediately below said intake chamber, each set of battery cells includes a single layer of battery cells extending in a same direction and being in a same plane, the two or more sets of battery cells is stacked in an orthogonal direction that is orthogonal to the same plane, and the intake chamber extends parallel to the orthogonal direction.

4. A structure of a hybrid vehicle having an internal combustion engine and a motor, comprising:

a battery pack that has a secondary battery constituted by two or more sets of battery cells stacked in one of a vehicle traveling direction and a vehicle width direction for supplying electric power to said motor, an intake chamber provided adjacent to said secondary battery in a direction perpendicular to the direction along which said two or more sets of battery cells are stacked for supplying cooling air between each of said two or more sets of battery cells, and an exhaust chamber arranged opposite to said intake chamber relative to said secondary battery for exhausting the cooling air from between each of said two or more sets of battery cells, and that is arranged on a vehicle floor;

an exhaust passage having an exhaust port and extending from said internal combustion engine, passing below said vehicle floor, to said exhaust port; and a catalyst portion provided on a route of said exhaust passage for purifying exhaust gas, wherein said exhaust passage is provided so that it passes immediately below said battery pack, and said catalyst portion is arranged at a position displaced from a position immediately below said battery pack, each set of battery cells includes a single layer of battery cells extending in a same direction and being in a same plane, the two or more sets of battery cells is stacked in an orthogonal direction that is orthogonal to the same plane, and the intake chamber extends parallel to the orthogonal direction.

5. The structure of a hybrid vehicle according to claim 4, wherein said secondary battery is constituted by two or more sets of battery cells stacked in the vehicle traveling direction, said two or more sets of battery cells includes a first battery cell region positioned relatively near to said intake chamber, and a second battery cell region positioned relatively far from said intake chamber, and said exhaust passage is provided so that it passes immediately below said first battery cell region.

6. A structure of a hybrid vehicle having an internal combustion engine and a motor, comprising:

a battery pack that has a secondary battery constituted by two or more sets of battery cells stacked in a vehicle width direction for supplying electric power to said motor, an intake chamber provided adjacent to said secondary battery in a direction perpendicular to the direction along which said two or more sets of battery cells are stacked for supplying cooling air between each of said two or more sets of battery cells, and an exhaust chamber arranged opposite to said intake chamber relative to said secondary battery for exhausting the cooling air from between each of said two or more sets of battery cells, and that is arranged on a vehicle floor; and an exhaust passage having an exhaust port and extending from said internal combustion engine, passing below said vehicle floor, to said exhaust port, wherein said intake chamber and said exhaust chamber each include one end and an other end separated in a direction along which said two or more sets of battery cells are stacked, and extend from said one end to said other end, when the cooling air is introduced from said one end of said intake chamber and exhausted from said other end of said exhaust chamber, said exhaust passage is provided to pass immediately below said battery pack at a position nearer to said other end of said intake chamber and exhaust chamber than to said one end of said intake chamber and exhaust chamber, when the cooling air is introduced from said one end of said intake chamber and exhausted from said one end of said exhaust chamber, said exhaust passage is provided to pass immediately below said battery pack at a position nearer to said one end of said intake chamber and exhaust chamber than to said other end of said intake chamber and exhaust chamber, each set of battery cells includes a single layer of battery cells extending in a same direction and being in a same plane, the two or more sets of battery cells is stacked in an orthogonal direction that is orthogonal to the same plane, and the intake chamber extends parallel to the orthogonal direction.

* * * * *